March 13, 1962 W. H. ADAMS 3,025,194
METHOD OF AND APPARATUS FOR FORMING CHANNELED UPHOLSTERY
Filed Dec. 5, 1957 4 Sheets-Sheet 1
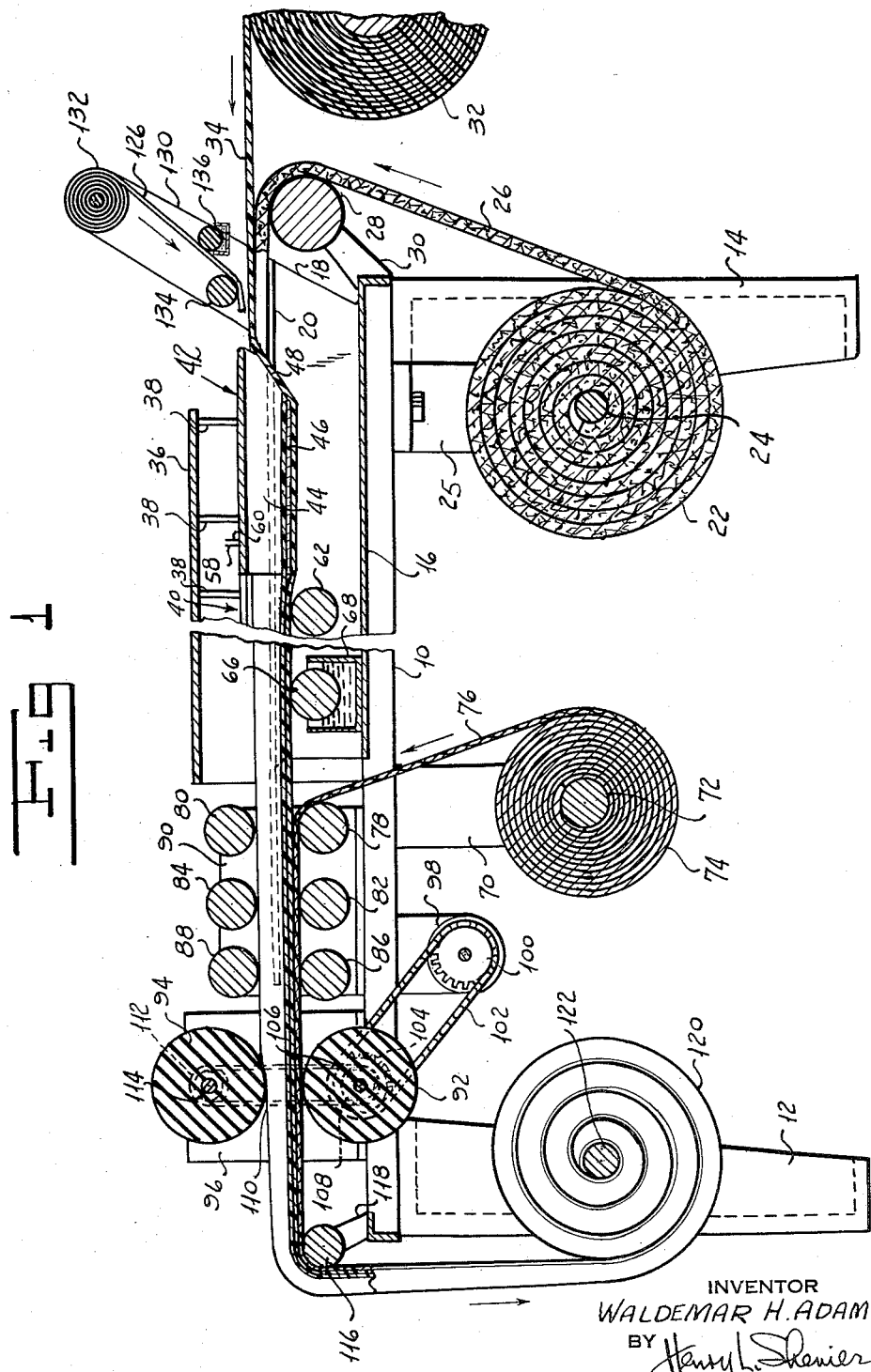
INVENTOR
WALDEMAR H. ADAMS
BY
ATTORNEY

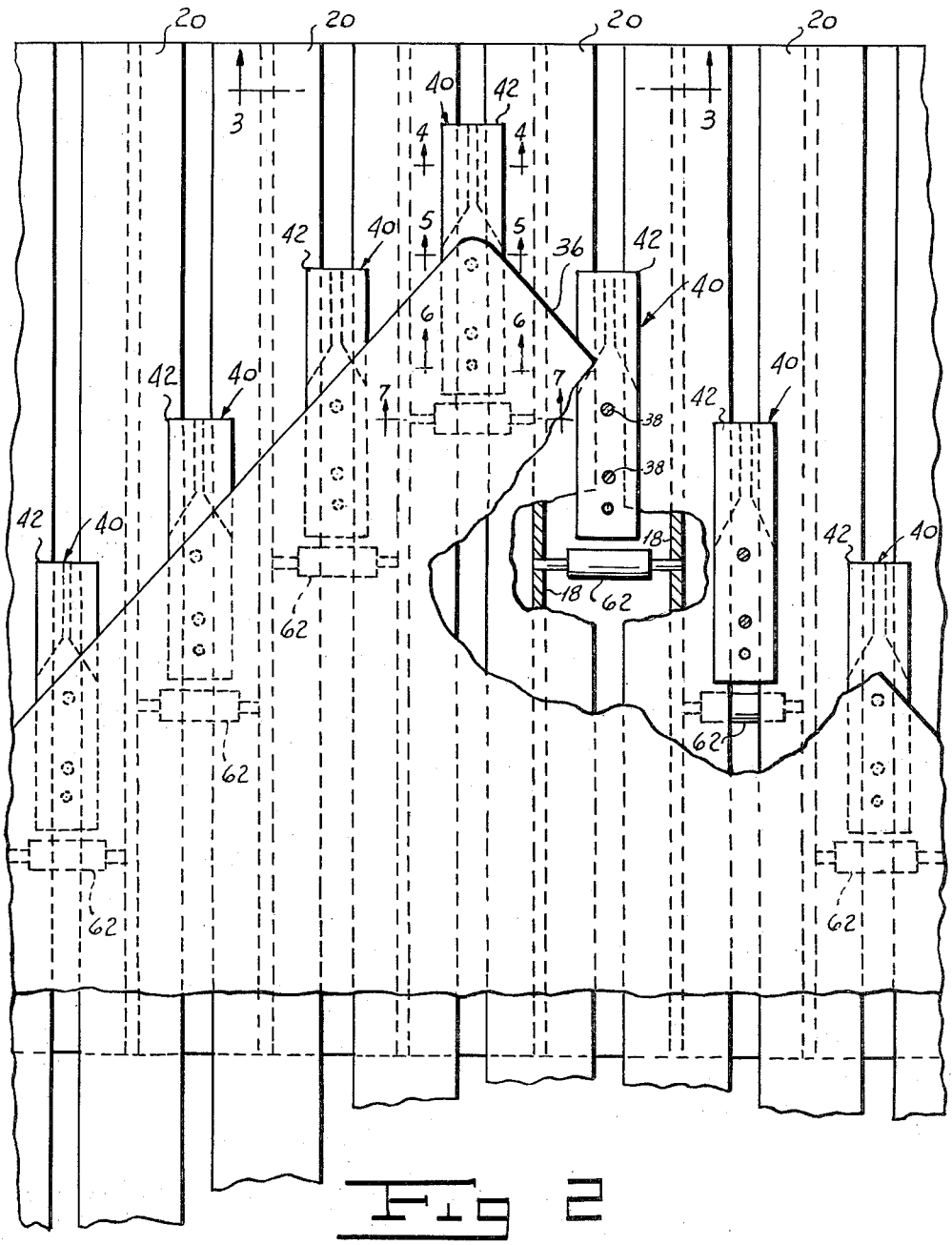

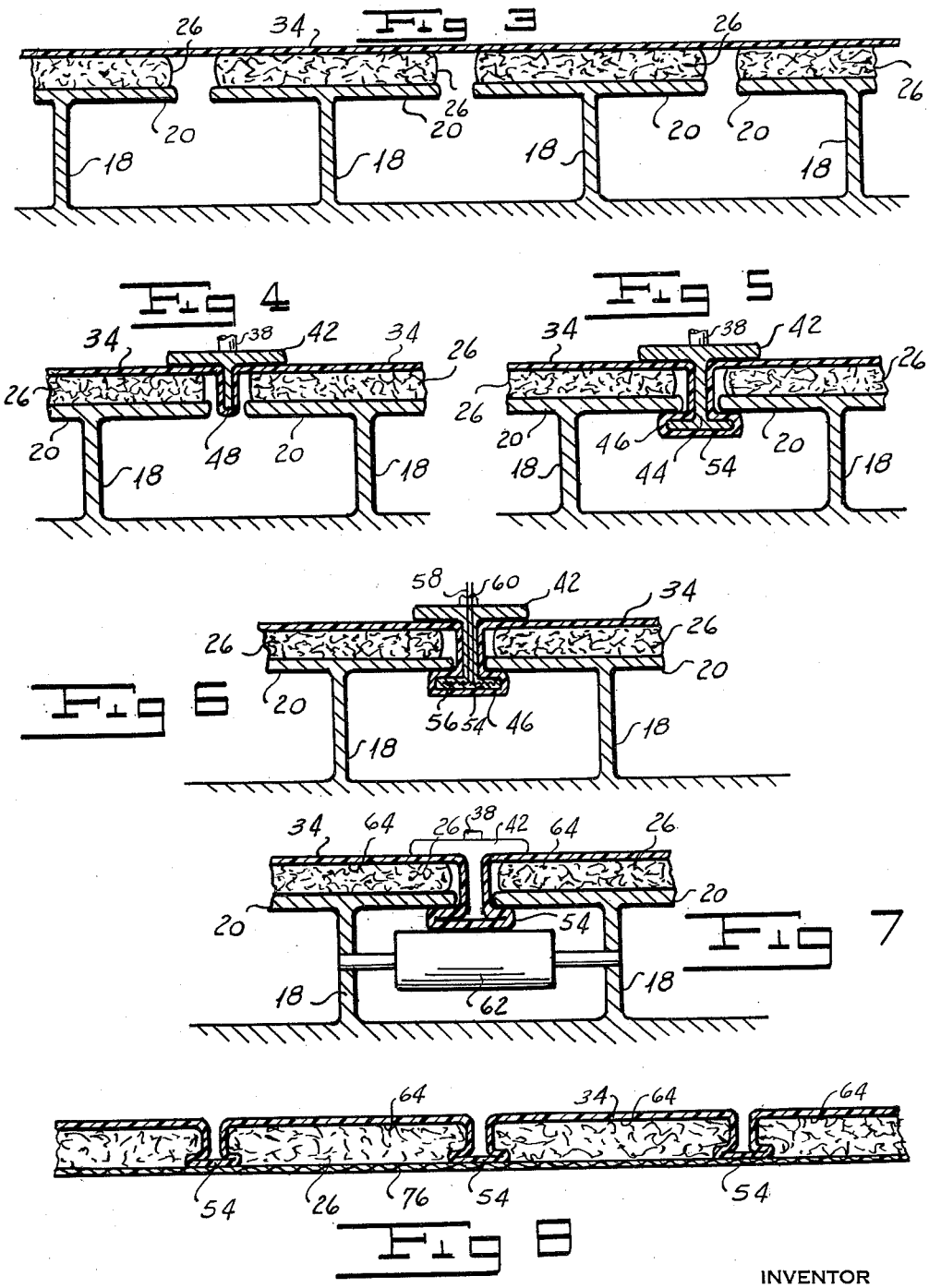

March 13, 1962  W. H. ADAMS  3,025,194
METHOD OF AND APPARATUS FOR FORMING CHANNELED UPHOLSTERY
Filed Dec. 5, 1957  4 Sheets-Sheet 4

INVENTOR
WALDEMAR H. ADAMS
BY Harry L. Shenier
ATTORNEY

United States Patent Office 3,025,194
Patented Mar. 13, 1962

3,025,194
METHOD OF AND APPARATUS FOR FORMING
CHANNELED UPHOLSTERY
Waldemar H. Adams, Birmingham, Mich., assignor to
Gustin-Bacon Manufacturing Company, Kansas City,
Mo., a corporation of Missouri
Filed Dec. 5, 1957, Ser. No. 700,788
11 Claims. (Cl. 156—201)

My invention relates to a method of and apparatus for forming channeled upholstery and more particularly to an improved method and apparatus for forming channeled upholstery which overcomes the disadvantages of the prior art.

Channeled upholstery is well known in the prior art. With the increasing popularity of sports cars in recent years, channeled upholstery has come into wide use in the automotive industry. Various methods are known in the prior art for forming channeled upholstery. In the formation of channeled upholstery a cover material such, for example, as a vinyl plastic sheet is formed into a number of channels or elongated pockets which are filled with a bonded fibrous material such, for example, as bonded nylon fibers. This assembly of the cover and filler material is then secured to a muslin backing. In one method of the prior art the channels are formed by stitching the material along lines to form pleats along the length of the sheet separating adjacent channels. This method of the prior art has proved unsatisfactory, since the stitching is visible between the channels and therefore detracts from the appearance of the finished upholstery.

In another method of the prior art for forming channels the bases of folds or pleats between the channels are stitched directly to the muslin backing. In use of this form of channeled upholstery the upholstery assumes a "sausage" shape in cross section. The clean-cut appearance of the upholstery is lost and the stitching is exposed to view resulting in an unsatisfactory product.

I have invented a method and apparatus for forming channeled upholstery which overcomes the disadvantages of the prior art methods discussed hereinabove. My method involves no stitching with the result that no unsightly stitching can be exposed to view. My invention has the further advantage of permitting the backing material to absorb the load whether the upholstery is trimmed very tightly or not. It provides a pleat or fold which does not pull out even under severe loads applied at right angles to the direction of the pleats or folds. Upholstery produced according to my method on my apparatus does not have the tendency to assume a "sausage" shape in cross section. My invention permits the continuous formation of channeled upholstery having any practicable number of channels. The channels formed by my method have very little tendency to pull out.

One object of my invention is to provide a method of forming channeled upholstery which overcomes the disadvantages of methods of the prior art.

Another object of my invention is to provide apparatus for forming channeled upholstery in an improved manner over apparatus of the prior art.

A further object of my invention is to provide a method of forming channeled upholstery, the pleats of which have little tendency to pull out even under severe loads applied at right angles to the direction of the pleats.

A still further object of my invention is to provide a method for forming channeled upholstery which permits the backing material to absorb the load whether the upholstery is very tightly trimmed or not.

Yet another object of my invention is to provide a method for forming channeled upholstery which employs no stitching.

Another object of my invention is to provide a method for forming channeled upholstery which permits various styling features to be incorporated in the upholstery.

Other and further objects of my invention will appear from the following description.

In general my invention contemplates the provision of a method of forming channeled upholstery including the steps of advancing a sheet of flexible cover material while forming a plurality of spaced folds or pleats along the length of the sheet to define channels between the pleats or legs. I form each pleat with protruding portions adjacent its bottom. As the sheet advances, I feed lengths of filler material to the channels between the folds. I next adhere adjacent inner surfaces of the protruding portion to form bases attached to the pleats. Where the cover material is thermoplastic, after the pleats are formed I heat the material in the area of the protruding portions to a plastic state and press these portions together to heat-seal them to form bases. After the bases are thus formed, I apply an adhesive to each base and advance a fabric backing along with the assembly of the filler and cover material to adhere the backing material to the bases of the pleats. Where the cover material is not itself heat-sealable, I adhere strips of heat-sealable material to the sheet along its length in the areas in which the folds are to be formed and heat-seal these strips to themselves after formation of the pleats. I provide apparatus for continuously performing my method with a sheet of cover material of any width.

In the accompanying drawings which form part of the instant specification and which are to be read in conjunction therewith and in which like reference numerals are used to indicate like parts in the various views:

FIGURE 1 is a sectional view of one form of my apparatus by means of which I may perform my method of making channeled upholstery.

FIGURE 2 is a fragmentary top plan view of the apparatus shown in FIGURE 1 with parts broken away and drawn on an enlarged scale.

FIGURE 3 is a fragmentary sectional view of the form of my apparatus for performing my method of making channeled upholstery taken along the line 3—3 of FIGURE 2 and drawn on an enlarged scale.

FIGURE 4 is a fragmentary sectional view of the form of my apparatus shown in FIGURE 2 taken along the line 4—4 of FIGURE 2 and drawn on an enlarged scale.

FIGURE 5 is a fragmentary sectional view of the form of my apparatus for performing my method shown in FIGURE 2 taken along the line 5—5 of FIGURE 2 and drawn on an enlarged scale.

FIGURE 6 is a fragmentary sectional view of the form of my apparatus shown in FIGURE 2 for performing my method taken along the line 6—6 of FIGURE 2 and drawn on an enlarged scale.

FIGURE 7 is a fragmentary sectional view of the form of my apparatus shown in FIGURE 2 for practicing my method taken along the line 7—7 of FIGURE 2 and drawn on an enlarged scale.

FIGURE 8 is a fragmentary sectional view of the finished product produced by my method of forming channeled upholstery.

Figure 9:
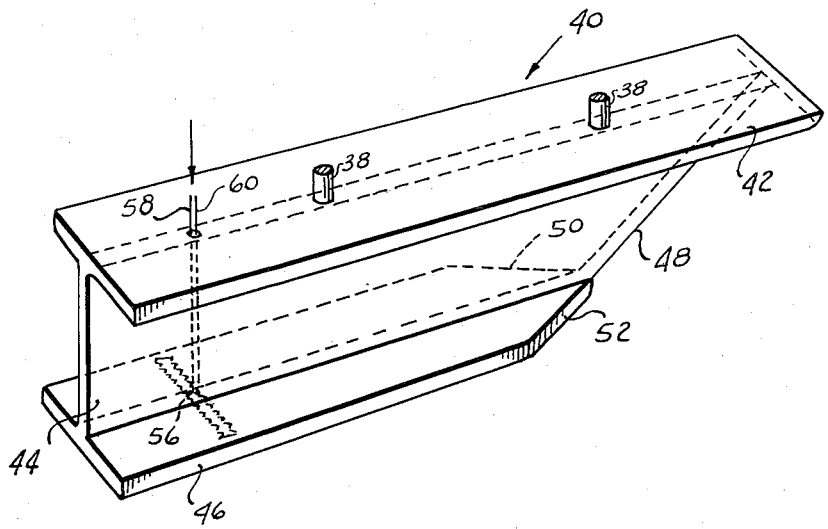
FIGURE 9 is a perspective view of one of the forming bars included in my apparatus for performing my method of making channeled upholstery.

Referring now to FIGURES 1 to 3 of the drawings, one form of apparatus on which my method may be performed includes a rectangular framework 10 supported on legs, one pair of which legs 12 and 14 are shown in FIGURE 1. A table 16 extending between the sides of the frame 10 carries a plurality of upright supports 18 which support a plurality of elongated flat working bars 20. The bars 20 extend from right to left of the frame 10 as viewed in FIGURE 1 to provide a plurality of elongated flat working surfaces separated by narrow spaces.

A roll 22 of spaced strips of upholstery filler material such, for example, as bonded nylon fibers or foam rubber or the like is carried by an idler shaft 24 rotatably supported in brackets 25 one of which is shown in FIGURE 1 to permit the strips 26 of filler material to be drawn from the roll 22. In the practice of my method I feed the strips 26 over a guide roll 28 rotatably supported in brackets 30 carried by the frame 10. After passing over guide roll 28 the strips 26 are drawn along the upper surfaces of working bars 20 by drawing rolls to be described hereinafter.

A roll 32 rotatably supported by any convenient means (not shown) known to the art forms a supply of a sheet 34 of cover material. In my method of making channeled upholstery I feed the sheet 34 through my apparatus under the action of the drawing rolls to be described hereinafter. As can be seen by reference to FIGURE 1 in its initial passage into the apparatus the sheet 34 overlies the spaced strips 26 of filler material.

A plate 36 supported by frame 10 overlies a portion of the working bars 20. Any convenient means such as a plurality of connectors 38 or the like suspend a number of forming bars indicated generally by the reference character 40 to the underside of plate 36. As can be seen by reference to FIGURE 9 each of the forming bars has a top 42 disposed over the bars 20 and a depending portion having the shape of an inverted T the leg 44 of which extends downwardly between adjacent bars 20 with the base 46 of the inverted T disposed below the bars 20. As the sheet 34 advances into the machine, as viewed in FIGURE 1, it engages the leading edge 48 of the leg of the first of the forming bars 40.

As can be seen by reference to FIGURE 2, the forming bars 40 are staggered rearwardly of the machine from the first forming bar engaged to the last forming bar for a reason which will be explained hereinafter. The leading edge 48 of each of the forming bars 40 is tapered rearwardly and downwardly between a pair of adjacent working bars 20 to begin the formation of a bead or pipe in the sheet 34. This action of the forming bar is shown in FIGURE 4. After the sheet is folded downwardly between a pair of adjacent working bars 20 it engages the leading edges 50 and 52 of the base 46 of the forming bar. These leading edges 50 and 52 flare outwardly and rearwardly from the edge 48 to the outer edges of the base 46. As the sheet advances, the leading edges 50 and 52 separate the base of the bead or fold formed by edge 48 to produce a pleat having protruding portions adjacent its bottom in the sheet 34. The action of the leading edges 50 and 52 in forming the pleat 54 having the protruding portions is shown in FIGURE 5.

After forming the pleats with protruding portions I adhere the adjacent inner surfaces of the protruding portions by any suitable means such as an adhesive. Preferably, I heat-seal these portions. In one form of my method the sheet 34 being worked on is formed of heat-sealable material such, for example, as a vinyl plastic. I provide means for heating the base of the pleat 54.

This heating means may take any convenient form. For example, it may be a resistance heating element 56 imbedded or otherwise disposed in the base 46 and adapted to be energized by respective conductors 58 and 60 connected to a suitable source of electrical potential (not shown). Alternatively to the use of a resistance heating element I may employ any other heating means such, for example, as dielectric heating, steam, or the like.

As can be seen by reference to FIGURES 1, 2 and 6 after the sheet 34 has the pleat 54 formed therein, it passes to the region of the heating element 56 in base 46. At this point I heat the material of the protruding portions of the pleat 54 to a plastic state. Shortly after this heating takes place the pleat base passes off the end of base 46. As can be seen by reference to FIGURES 1, 2 and 7 after the now-plastic pleat 54 leaves the base 46, it engages a pressure roller 62 rotatably supported between a pair of the uprights 18. Roller 62 squeezes the protruding portions of the base of pleat 54 up against the underside of working bars 20 to cause the adjacent inner surfaces of the protruding portions to be heat-sealed.

Thus far I have described my method and apparatus with respect to the initially encountered forming bar 40. It will be appreciated that under the action of this bar which may, for example, be located centrally of the machine, as shown in FIGURE 2, the sheet 34 is drawn inwardly toward the bar. It will be appreciated that with this action a number of bars disposed side by side in a row could not be employed without tearing or otherwise damaging the cover sheet 34. For this reason, I stagger the succeeding forming bars 40 rearwardly of the initial bar so that, while material is continually being drawn inwardly of the machine, at no time is an undue strain placed on sheet 34. It is to be understood that the action of the remaining forming bars following the initial bar is similar to that described hereinabove with respect to the initial bar.

From the foregoing it will be seen that after having been acted upon by the forming bars 40, the sheet 34, as can be seen by reference to FIGURE 7, includes a plurality of channels 64 each containing a strip 26 of filler material and separated by pleats 54, the re-entrant portions of which are heat-sealed. To complete the channeled upholstery assembly it remains to apply the backing material. Referring again to FIGURE 1, after passing the pressure rollers 62 the assembly of the formed sheet 34 and the strips 26 encounters a plurality of doctor rolls 66 rotatably supported between pairs of uprights 18 and adapted to engage and be driven by the undersides of the heat-sealed pleats 54. As a doctor roll 66 rotates it picks up adhesive from a reservoir 68 and applies it to the underside of the corresponding pleat 54. Brackets 70, one of which is shown in FIGURE 1, are carried by the frame 10 and support an idler shaft 72 carrying a roll 74 forming a supply of a sheet 76 of backing material such, for example, as muslin or the like. Sheet 76 passes from the roll 74 to the lower roll 78 of the first pair of a number of pairs of pressure rolls 78 and 80, 82 and 84, and 86 and 88. In order to permit sheet 76 to pass up to the roll 78 to form a continuous backing over the entire assembly, I terminate the table 16 and the uprights 18 before the assembly of sheet 34 and strips 26 passes to the pressure rolls. The bars 20, however, extend rearwardly of the terminal point of table 16. The rearwardly extending portions of the bars 20 are supported by the pressure rolls. I rotatably support the pairs of pressure rolls between pairs of bearing brackets 90 one of which is shown in FIGURE 1 as being carried by frame 10. As the muslin sheet 76 and the assembly sheet 34 and strips 26 pass through the pressure rolls the sheet 76 is adhered to the undersides of the pleats 54 by means of the adhesive applied to the pleats by rolls 66. It is to be understood that I may, if desired, also apply adhesive to the surface of sheet 76 by means of a suitable doctor roll or the like. The pressure applied by the pairs of pressure rolls, including rolls 78 and 80, could, if desired, be applied through the narrow spaces or slots between the working bars 20 as well as by the roller pressure on the sheet from the bottom.

I terminate the bars 20 at the point at which the assembly leaves the final pair of pressure rolls 86 and 88.

After the assembly leaves the pressure rolls, it passes through a pair of drive rolls 92 and 94 rotatably supported in brackets, one bracket 96 of which is shown in FIGURE 1. Any convenient means such as a motor 98 driving a sprocket wheel 100 which drives a pitch chain 102 may be used to drive rolls 92 and 94. Chain 102 may, for example, drive a first sprocket wheel 104 which drives the shaft 106 of roll 92. A second sprocket wheel 108 carried by shaft 106 for rotation with the shaft may drive a chain 110 to drive a sprocket wheel 112 on the shaft 114 of roll 94 to drive the roll 94.

After passing through the driving rolls 92 and 94, the completed assembly passes over a guide roll 116 rotatably supported in brackets 118 carried by the frame 10 to a roll 120 for storing the completed upholstery. Roll 120 may be carried, for example, by a shaft 122 driven by any convenient means known to the art.

As can be seen by reference to FIGURE 8 in the completed product the bases of the pleats 54 are flush with the undersides of the strips 26. These pleats 54 are secured to the fabric backing 76 in the manner described hereinabove. Any load in stretching across the width of the completed assembly is absorbed substantially entirely by the backing 76 with very little of the load being applied to the pleats 54. This is true no matter how tightly the material is trimmed. No unsightly stitching is exposed to view and the pleats or folds 54 will not pull out.

Figure 10:
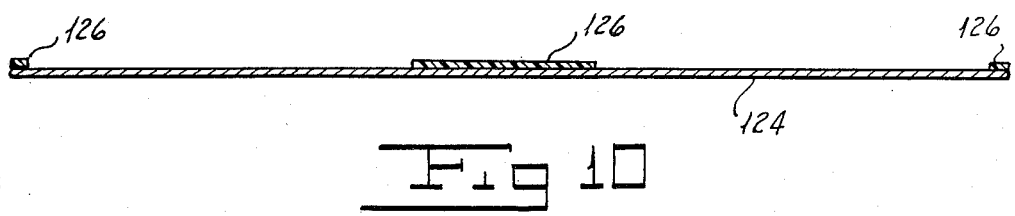
FIGURE 10 is a sectional view of a non-heat-sealable cover material provided with heat-sealing strips in an alternate form of my method of making channeled upholstery.
Figure 11:
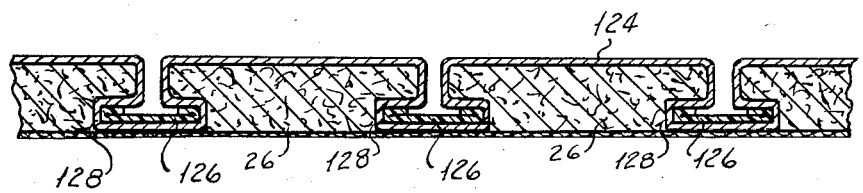
FIGURE 11 is a fragmentary sectional view of the finished product produced in the alternate form of my method of making channeled upholstery.

In another form of my method I use a cover material such, for example, as leather or the like which is not itself heat-sealable. Referring to FIGURES 1, 10 and 11 in this form of my method, as I feed a sheet 124 of non-heat-sealable material into the machine in place of the sheet 34 shown in FIGURE 1 and at the same time I superpose on and adhere to the sheet 124 a plurality of spaced strips 126 of heat-sealable material. I so space these strips 126 that they overlie the narrow spaces between adjacent working bars 20. As the sheet 124, strips 126 and strips of filler material 26 pass through the machine, pleats 128 having protruding portions adjacent their bottoms are formed in the sheet 124 and the edges of the strips 126 are folded in upon themselves in the manner shown in FIGURE 11. The strips are then heated and pressed to form the finished product. As is shown in FIGURE 1 a bracket 130 may support a number of rolls 132 forming supplies of strips 126 which are guided to the top of the sheet such as sheet 124 by a guide roller 134 carried by bracket 130. The adhesive to secure the strips to sheet 124 may be applied by any convenient means such as a doctor roll 136.

In the practice of my method of making channeled upholstery where the cover material of the upholstery is a heat-sealable material such as the vinyl plastic sheet 34 I first feed the sheet 34 together with the spaced strips of filler material 26 such as fibrous bonded nylon into my apparatus over the working bars 20. As the sheet and strips enter the machine the sheet first encounters the leading edge 48 of the leg 44 of the first forming bar 40. As movement of the sheet progresses, the leg 44 draws the sheet inwardly of the machine and pushes it down between a pair of adjacent working bars 20 to begin the formation of a fold or pleat. As the sheet and strips advance further the leading edges 50 and 52 of the base of the first forming bar 40 separate the bottom of the fold formed by leg 44 to form the protruding portions adjacent the bottom of the pleat 54. From the leading edges 50 and 52 the sheet having the pleat formed therein passes to the portion of base 46 heated by any convenient means such as the resistance heating element 56. At this point in my process the heat-sealable material in the protruding portions of the pleat is heated to a plastic state.

After having been heated to a plastic state the sheet having the pleat 54 therein passes off the base 46 to be engaged by a roller 62 which presses the protruding portions of the pleat up against the bottoms of a pair of working bars 20 to seal these portions of the welt. It is to be understood that the action of all the forming bars 40 and rollers 62 is similar to that described in connection with the first forming bar and roller. In order to prevent undue strain from being imposed on the cover material, I stagger the forming bars 40 from the front to the rear of the machine.

After having passed by all the forming bars to have the heat-sealed pleats formed therein, the assembly passes over the doctor roll 66 which applies adhesive to the undersides of the pleats. From this point the assembly passes through the pairs of pressure rolls at which the sheet 76 of fabric backing is applied to the assembly. After passing through these pressure rolls and the feed rolls 92 and 94 the finished product is wound onto the roll 120.

Upon emerging from the pressure rolls the channeled upholstery is in its finished state shown in section in FIGURE 8 in which the sealed pleats 54 are disposed between adjacent channels 64 in which the strips 26 of filler material are disposed. In its finished condition the bottoms of the pleats 54 are very nearly flush with the undersides of strips 26.

Where my method is to be used with a cover material which is not heat-sealable such, for example, as the leather sheet 124, as the sheet 124 passes into the machine I adhere spaced strips 126 to the upper surface of the sheet so that the strips overlie the narrow spaces between adjacent bars 20. The forming operation then takes place in the same manner as where a heat-sealable cover material is used. The heat-sealable strips 126 have their edges folded inwardly and sealed to the body of the strip. This form of my invention is particularly adapted to the formation of channeled upholstery embodying styling features such as a contrasting color at the base of the pleats between adjacent channels. For purposes of clarity I have indicated the direction of movement of the various components being fed to my apparatus by arrows in FIGURE 1.

It will be seen that I have accomplished the objects of my invention. I have provided a method of making channeled upholstery which overcomes the disadvantages of methods of the prior art. My method employs no stitching so that there is no possibility of unsightly stitching being exposed to view. The backing material of upholstery produced according to my method absorbs most of the load no matter how tightly the upholstery is trimmed. The pleats or folds of my upholstery will not pull out even under rather severe loads applied to the upholstery at right angles to the direction of the pleats or folds. My method is adaptable either to a cover material which is heat-sealable or to a nonheat-sealable cover material. By use of my method channeled upholstery embodying all the above-outlined desirable features may continuously be produced. Upholstery produced according to my method has no tendency to assume a "sausage" shape in cross section. My method is adapted to the production of upholstery having different styling features.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention what I claim is:

1. A method of making channeled upholstery including the steps of advancing a sheet of flexible material longitudinally, simultaneously with said advancing step forming a plurality of pleats along the length of said sheet to provide a plurality of legs defining channels extending between the pleats, then forming protruding portions extending laterally from adjacent the end of each leg remote from said sheet and then adhering adjacent inner surfaces of said protruding portions to each other to form bases attached to said legs with the bases being spaced from said sheet by said legs to leave a space between each of said protruding portions and the sheet.

2. A method of making channeled upholstery including the steps of advancing a sheet of flexible material longitudinally, simultaneously with said advancing step forming a plurality of pleats along the length of said sheet to provide a plurality of channels extending between the pleats, feeding lengths of fibrous material into said channels as the sheet advances, then forming protruding portions extending laterally from adjacent the bottom of each of said pleats and then adhering adjacent inner surfaces of said protruding portions to each other to form bases attached to said pleats.

3. A method of making channeled upholstery including the steps of advancing a sheet of flexible material longitudinally, simultaneously with said advancing step forming a plurality of pleats along the length of said sheet to provide a plurality of legs defining channels extending between the pleats, then forming protruding portions, extending laterally from adjacent the end of each leg remote from said sheet, then adhering adjacent inner surfaces of said protruding portions to each other to form bases attached to said legs with the bases being spaced from said sheet by said legs to leave a space between each of said protruding portions and the sheet and then securing a sheet of backing material to said bases as said sheet advances.

4. A method of making channeled upholstery including the steps of advancing a sheet of flexible heat-sealable material longitudinally, simultaneously with said advancing step forming a plurality of pleats along the length of said sheet to provide a plurality of legs defining channels extending between the pleats, then forming protruding portions extending laterally from adjacent the end of each leg remote from said sheet and then heat-sealing adjacent inner surfaces of said protruding portions to each other to form bases attached to said legs with the bases being spaced from said sheet by said legs to leave a space between each of said protruding portions and the sheet.

5. A method of making channeled upholstery including the steps of advancing a sheet of flexible material longitudinally, adhering strips of heat-sealable material to said sheet as it advances, simultaneouly with said advancing step forming a plurality of pleats including respective strips along the length of said sheet to provide a plurality of channels extending between the pleats, then forming protruding portions including said strips extending laterally from adjacent the bottoms of said pleats and then adhering adjacent inner surfaces of said strips to each other to form bases attached to said pleats.

6. Apparatus for making channeled upholstery including in combination a frame, means for advancing a sheet of flexible cover material along said frame, means carried by said frame for forming a pleat having protruding portions extending laterally from adjacent its bottom along the length of a sheet advanced along the frame at a location spaced from said sheet and means supported by said frame for adhering the adjacent inner surfaces of said protruding portions to each other to form a base attached to the pleat, said base being spaced from said sheet to define a space between said laterally extending portions and said sheet.

7. Apparatus for making channeled upholstery including in combination a frame, means for advancing a sheet of flexible upholstery cover material along said frame, a plurality of elongated working bars carried by the frame, a plurality of forming bars, means mounting said forming bars on said frame to cooperate with the working bars to form a number of spaced pleats having protruding portions extending laterally from adjacent their bottoms along the length of a sheet being advanced along the frame and means for adhering adjacent inner surfaces of the protruding portions to each other to form bases attached to the pleats.

8. Apparatus for making channeled upholstery including in combination a frame, means for advancing a sheet of flexible upholstery cover material along said frame, a plurality of elongated working bars, means mounting said working bars on said frame in spaced relationship to define a plurality of narrow spaces between adjacent working bars extending in the direction in which the sheet is fed, a plurality of forming bars each having a leg and a base in the form of an inverted T, means mounting said forming bars on said frame with said legs disposed in said spaces, said working bars and said forming bars cooperating to form a plurality of channel-defining pleats having protruding portions extending laterally from adjacent their bases along the length of a sheet being fed along the frame and means carried by the frame for adhering adjacent inner surfaces of said protruding portions to each other to form bases attached to the pleats.

9. Apparatus as in claim 8 in which said adhering means comprises means for heating said protruding portions and means for pressing said adjacent inner surfaces together.

10. Apparatus as in claim 8 including means supported by said frame for adhering a backing material to said pleat bases.

11. Apparatus as in claim 8 including means for applying heat-sealable strips to said sheet in the areas in which said pleats are to be formed.

References Cited in the file of this patent

UNITED STATES PATENTS

| | | |
|---|---|---|
| 229,535 | Hunt | July 6, 1880 |
| 790,159 | Schramm | May 16, 1905 |
| 1,825,573 | Brintnall | Sept. 29, 1931 |
| 2,065,388 | Mitchell | Dec. 22, 1936 |
| 2,120,120 | Wells | June 7, 1938 |
| 2,318,702 | Millar | May 11, 1943 |
| 2,622,051 | Hermanson et al. | Dec. 16, 1952 |
| 2,636,541 | Rutherford | Apr. 28, 1953 |
| 2,741,203 | Rand | Apr. 10, 1956 |
| 2,926,720 | Gosman | Mar. 1, 1960 |

FOREIGN PATENTS

| | | |
|---|---|---|
| 504,070 | Great Britain | Apr. 19, 1938 |